United States Patent
Chin

[11] Patent Number: 5,653,454
[45] Date of Patent: Aug. 5, 1997

[54] BRAKE FOR AN IN-LINE ROLLER-SKATE BOOT

[76] Inventor: Taan Kuan Chin, 7th Fl., No. 227, Sec. 3, Roosevelt Rd., Taipei, Taiwan

[21] Appl. No.: 595,995

[22] Filed: Feb. 6, 1996

[51] Int. Cl.⁶ .............................. A63C 17/14; B60T 1/14
[52] U.S. Cl. .............................. 280/11.2; 188/5
[58] Field of Search .............. 188/5, 32; 280/11.22, 280/11.19

[56] References Cited

U.S. PATENT DOCUMENTS

| | | | |
|---|---|---|---|
| 333,751 | 1/1886 | Harris, Jr. | 280/11.2 |
| 5,462,296 | 10/1995 | Pozzobon | 280/11.2 |
| 5,486,012 | 1/1996 | Olivieri | 280/11.2 |

FOREIGN PATENT DOCUMENTS

| | | | |
|---|---|---|---|
| 567948 | 11/1993 | European Pat. Off. | 280/11.2 |
| 594080 | 4/1994 | European Pat. Off. | 280/11.2 |

*Primary Examiner*—Peter M. Poon
*Attorney, Agent, or Firm*—Ralph F. Crandell; Dorsey & Whitney LLP

[57] ABSTRACT

An adjustable brake structure for an in-line roller skate boot and wheeled chassis assembly is disclosed. The brake structure is formed by a sheathing attached to the boot assembly, a link block carrying a brake pad and pivotally secured to the boot assembly, and a lever operatively connecting the sheathing and link block. The lever is pivotally secured to the link block and adjustably secured to the sheathing by a flattened bolt engageable with a selected hole in the lever. The lever includes a series of holes connected by narrower neck openings to provide for adjustable engagement with the bolt.

2 Claims, 4 Drawing Sheets

BRAKE FOR AN IN-LINE ROLLER-SKATE BOOT

FIELD OF THE INVENTION

This invention relates to a brake structure, and more particularly, to a brake structure for an in-line rollerskate boot.

BACKGROUND OF THE INVENTION

This invention has particular application to a in-line roller skate boot. A conventional brake structure for an in-line roller-skate boot is shown in FIG. 5. The brake structure includes a sheathing 50, a brake lever 60, a link block 70 and a skate brake 80. The sheathing 50 is attached to a rear portion of the skate boot. The sheathing 50 has a vertical recess 51 defined in a bottom thereof. The recess 51 is partly by two opposite sides, in each of which an upper hole 52 and a lower hole 53 transversely extend. The brake lever 60 is substantially wedge-shaped and has two transverse holes (not numbered and only one can be seen) defined through a top portion thereof. A bottom portion of the brake lever 60 is connected with the link block 70 through a screw. Each of the transverse holes defined through the top portion of the brake lever 60 can align with either the lower hole 53 or the upper hole 52 when the top portion of the brake lever 60 is received in the recess 51 so that the brake lever 60 can have four securing positions relative to the sheathing 50. A screw 54 is used to extend through either the upper hole 52 or the lower hole 53 (in the shown case, it extends through the hole 53) and either of the two transverse holes in the top portion of the brake lever 60 (in the shown case it extends the upper one) to engage with a nut, thereby securing the brake lever 60 to the sheathing 50. The link block 70 defines a vertical groove 71 in which the bottom portion of the brake lever 60 is pivotally secured. The skate brake 80 is disposed below the link block 70.

However, there are several disadvantages of this design. Firstly, the brake lever 60 can have only four securing positions relative to the sheathing 50, which means that fine adjustment of the skate brake 80 is limited as the skate brake 80 gradually wears away and, thus, the safety of the user is impaired. Secondly, the retention of the brake lever 60 is provided by the screw and the nut, which are threadedly attached to each other, but may loosen through vibration of the skate boot. Additionally, when a user wants to adjust the level of the skate brake 80, a tool must be used to loosen the screw 54 and its engaging nut, which is inconvenient.

The present invention provides an improved brake structure to mitigate and/or obviate the aforementioned problems.

SUMMARY OF THE INVENTION

The present invention provides a brake structure for an in-line roller wheel skate boot which includes a sheathing attached to a rear portion of a skate boot. The sheathing has a flange projecting from a lower portion thereof, a fish-eye hole defined at a center portion of the flange, and a first hole at a bottom thereof corresponding to the fish-eye hole. A brake lever defines an upper portion and a lower portion, the upper portion, which is inserted into the flange, having a plurality of second holes defined therein along a length thereof, the lower portion having two tabs extending integrally and downwardly therefrom and a recess defined between two tabs. A link block has a rear end received in the recess and pivotally attached to the tabs and a front end pivotally attached to a wheel frame. A skate brake is disposed to the bottom of the rear end of the link block. A bolt extends through the fish-eye hole, one of the plurality of second holes of the brake lever aligned with the fish-eye hole and the first hole to fixedly retain the brake lever with respect to the flange of the sheathing.

Furthermore, the bolt includes a stepped head portion received within the fish-eye hole, a flat portion extending through one of the plurality of second holes, a rod portion received within the first hole and a protrusion portion extending out of the first hole.

One object of the present invention is to provide a brake structure which can be adjusted many times as the skate brake is increasingly worn away.

Another object of the present invention is to provide a brake structure, the brake lever of the brake structure can be tightly attached to the sheathing.

Another object of the present invention is to provide a brake structure, the position of the brake lever can be adjusted simply by using a simple every day object such as a coin rather than special tools.

Other objects, advantages, and novel features of the invention will become more apparent from the following detailed description when taken in conjunction with the accompanying drawings.

DESCRIPTION OF THE PREFERRED EMBODIMENT

Figure 1:
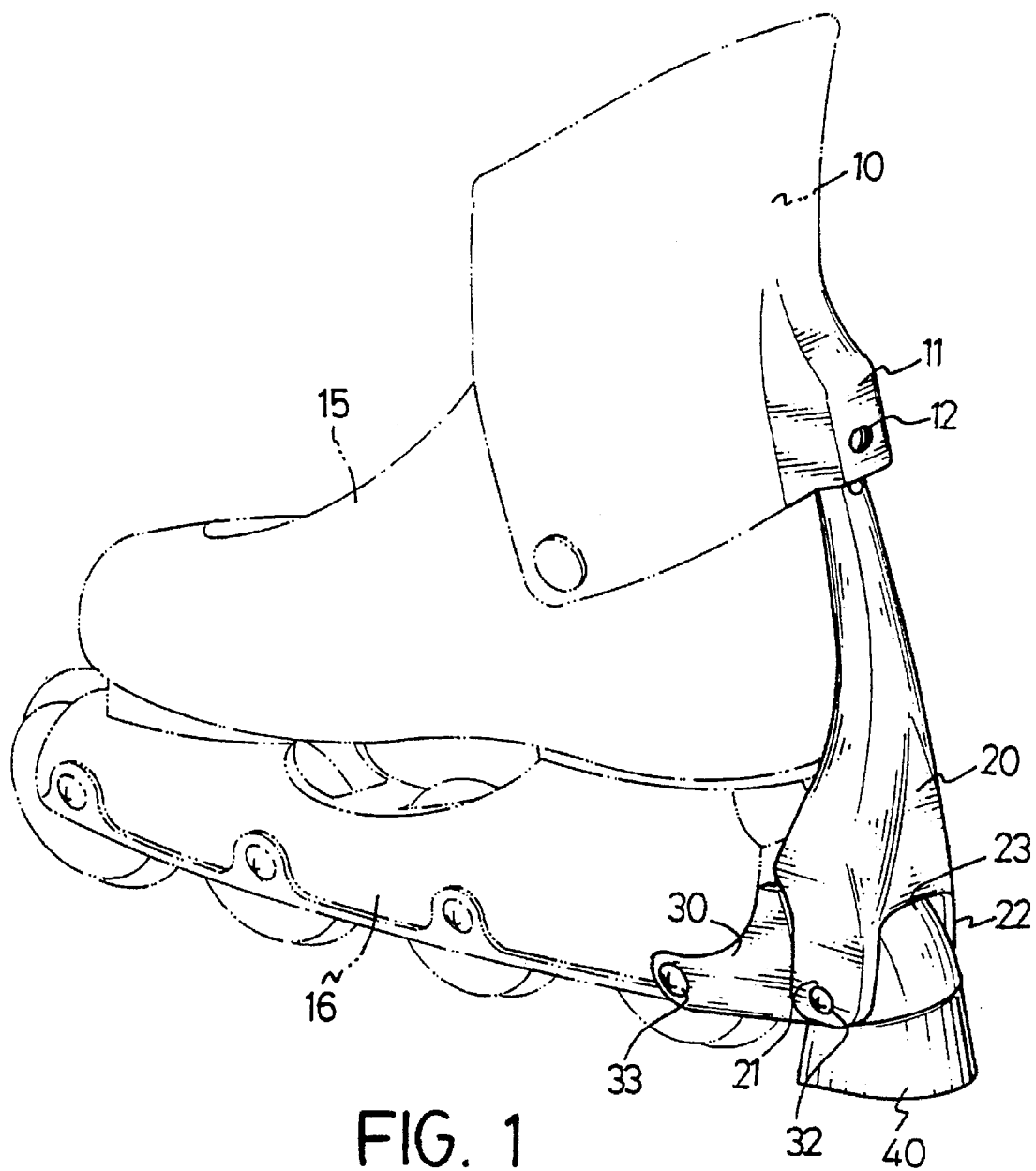
FIG. 1 is a perspective view of a brake structure for in-line roller-skate boot in accordance with the present invention.
Figure 2:
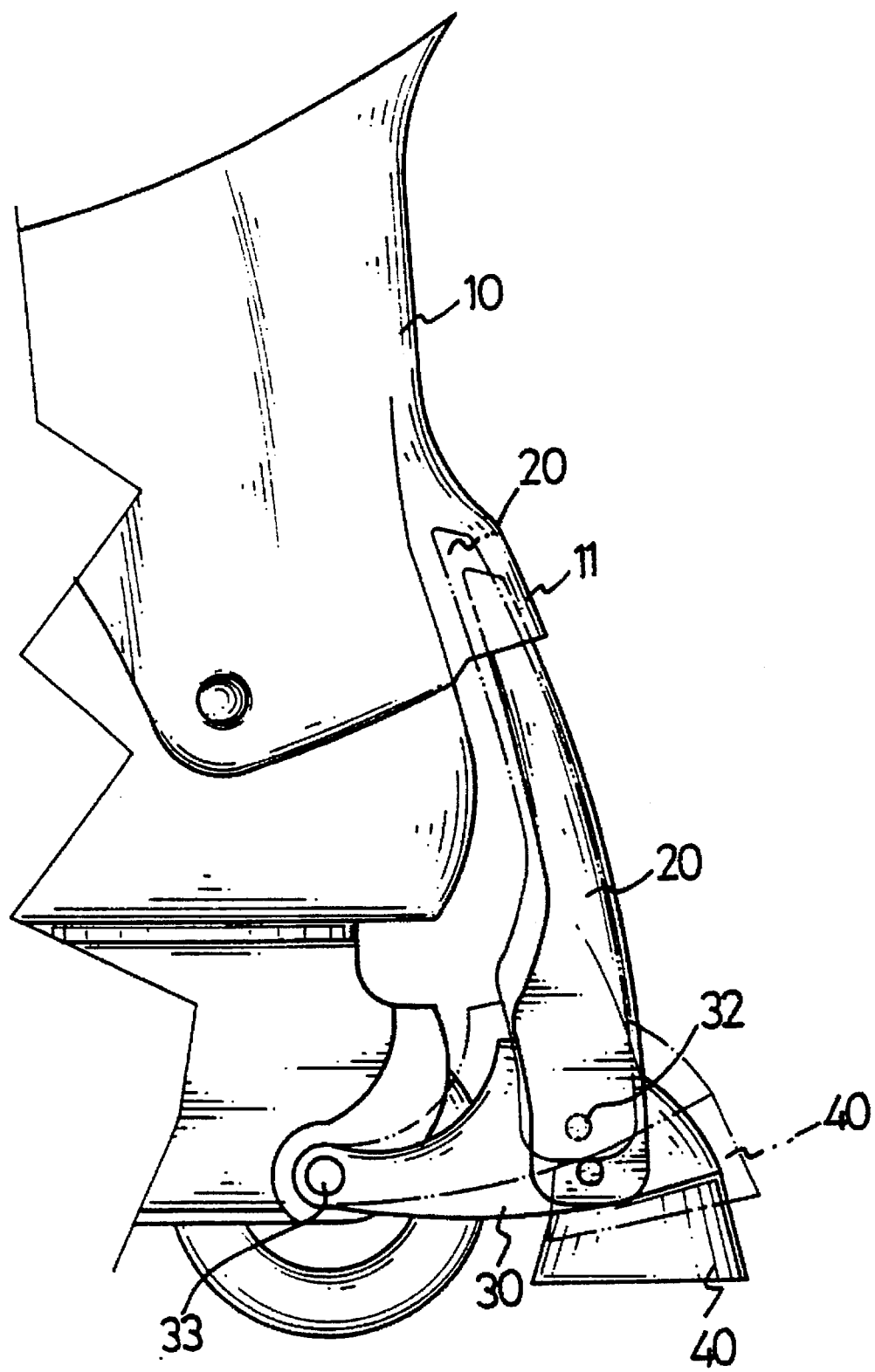
FIG. 2 is a partial side view of the brake structure in accordance with the present invention.

Referring to FIGS. 1 and 2, a brake structure for an in-line roller-skate boot assembly generally embodies a sheathing 10 attached to the rear of an in-line skate boot 15, a link block 30 pivotally secured to a wheeled chassis 16 on which the boot 15 is supported a brake lever 20 operatively connected between the sheathing 10 and the link block 30, and a skate brake 40 mounted on the link block 30.

Figure 3:
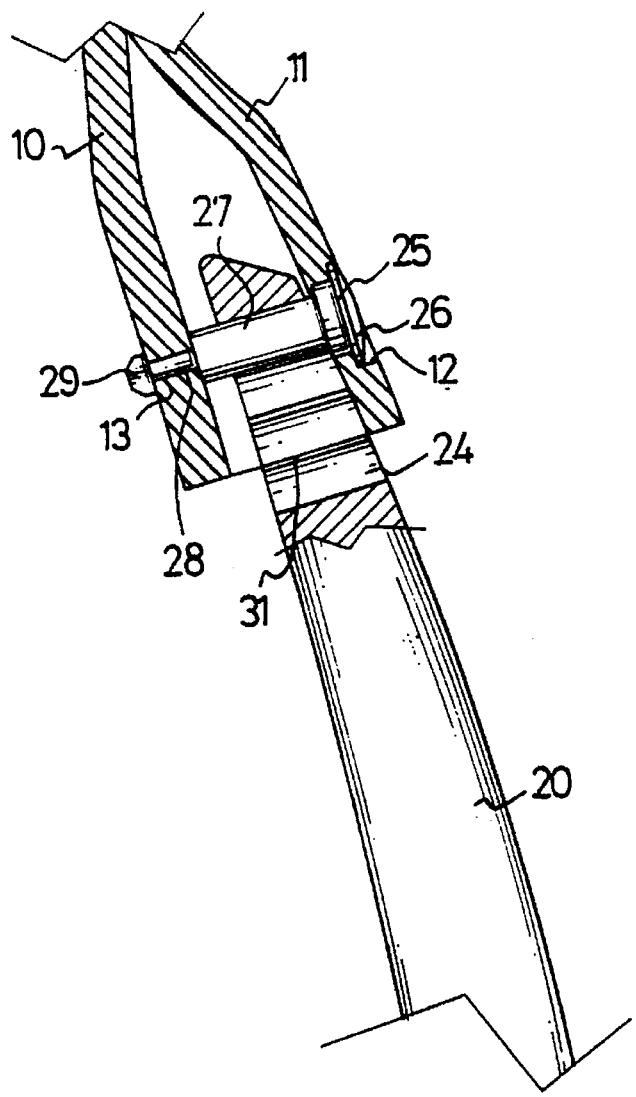
FIG. 3 is a cross-sectional side view of embodiment in accordance with the present invention.

The sheathing 10 is attached to a rear portion of the skate boot 15 as shown in FIG. 1. A flange 11 projects from a lower portion of the sheathing 10 and defines fish-eye hole 12 at a center portion thereof. A first hole 13 (see FIG. 3) is defined at the bottom of the sheathing 10 corresponding to the fish-eye hole 12.

The brake lever 20 defines an upper portion and a lower portion. Seen from the side, the brake lever 20 is substantially arcuate and the width of the lower portion is larger than that of the upper portion. The upper portion has a plurality of second holes 24 (see FIG. 4) defined therein along a length thereof, and the lower portion has two tabs 21 and 22 extending integrally and downwardly therefrom (FIG. 1). A cavity 23 is defined between the two tabs 21 and 22. It is to be noted that each of the holes 24 communicates With an adjacent hole 24 through a neck recess or opening 31 (FIG. 4)

In assembly, the upper portion of the brake lever 20 is inserted into the flange 11 whereby one of the plurality of second holes 24 aligns with the fish-eye hole 12 and first hole 13. A bolt 25 (see FIG. 3) extends through the fish-eye hole 12, one of the plurality of second holes 24 and the first hole 13 to fixedly retain the brake lever 20 with respect to the flange 11. The bolt 25 has a stepped head portion 26 received within the fish-eye hole 12, a flattened portion 27 extending through one of the plurality of second holes 24, a rod portion 28 received within the first hole 13 and a protrusion portion 29 extending beyond the first hole 13, whereby the brake lever 20 can be pivotally attached to the sheathing 10 by the bolt 25 (see FIG. 3). It is to be noted that the flattened portion 27 has a larger or major diameter or width and a narrow or minor width normal to the major width. The large diameter is nominally smaller than a diameter of each hole 24. The narrow width is nominally smaller than a width of the neck recess or opening 31 between a pair of holes. In a first position, the flat portion is horizontal with the mayor width transverse to the neck opening 31 such that the bolt cannot exit past the neck recess or opening 31. In a second position, the flat portion is vertical with the minor width transverse to the neck opening 31 allowing it to pass through the neck recess 31. The head portion 26 defines a traverse straight groove (not shown) such that the head portion 26 may be rotated by using a every day object such as a coin, rather than a special tool.

Furthermore, the link block 30 has a rear end received in the cavity 23 and pivotally attached to the tabs 21 and 22 by a pivot pin 32 and a front end pivotally attached to a wheel frame by a pivot pin 33. The skate brake 40 is secured to the bottom of the rear end of the link block 30.

Figure 4:
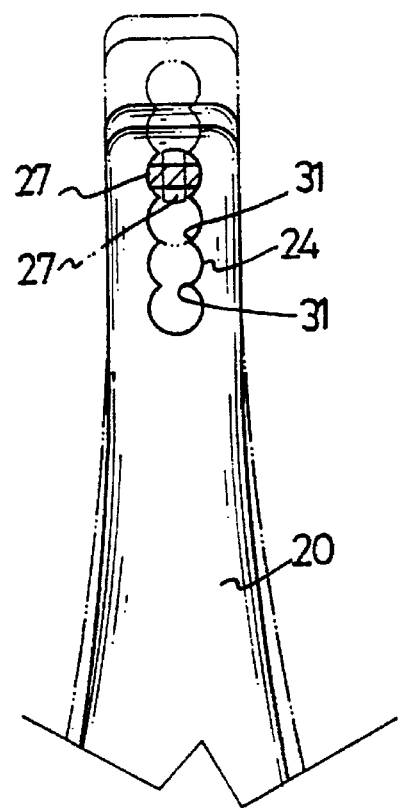
FIG. 4 is an elevation view of the brake lever of the prevent invention.
Figure 5:
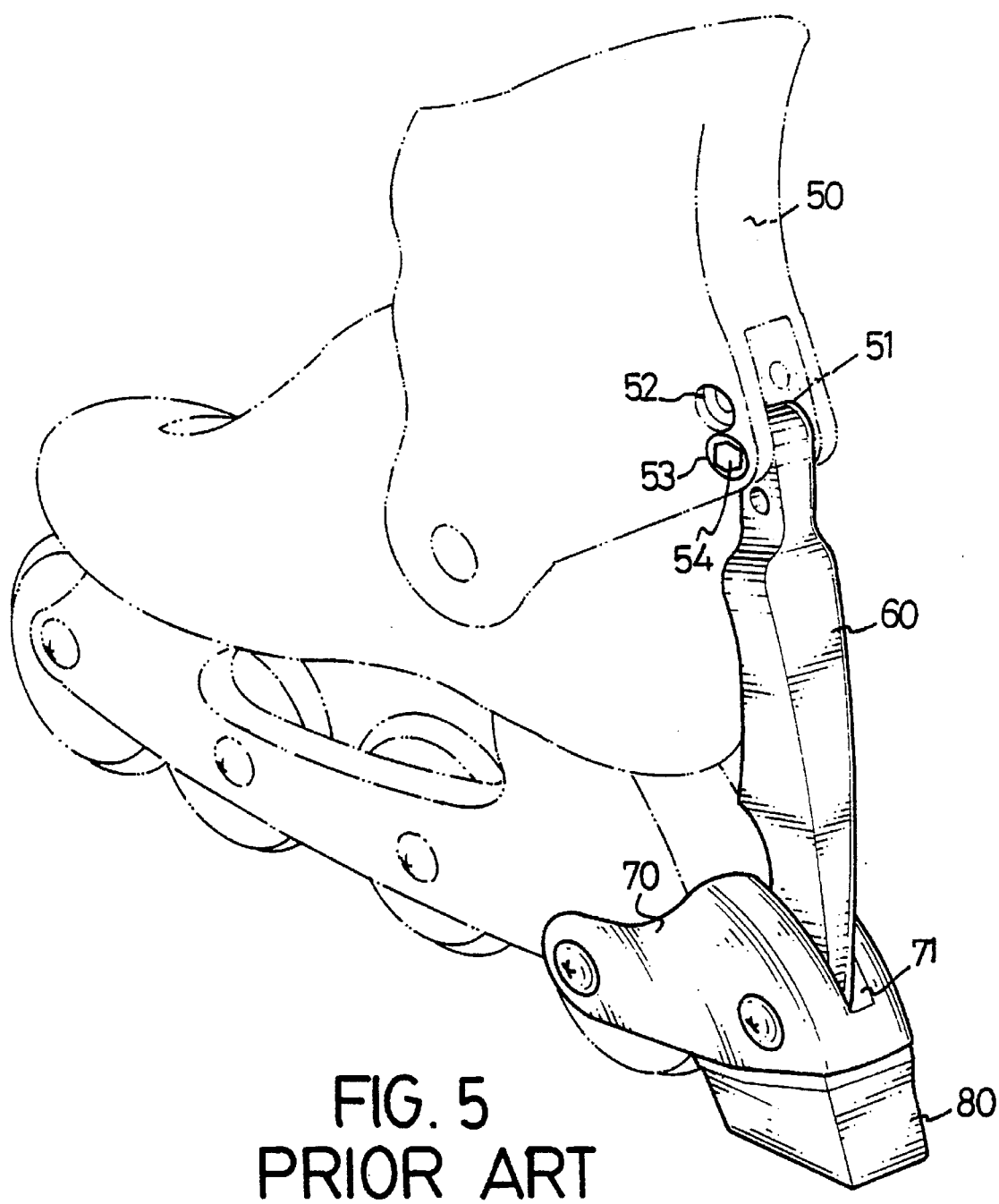
FIG. 5 is a perspective view of a conventional brake structure for an in-line roller-skate boot.

As seen in FIGS. 2 and 4, when the skate brake 40 is worn from use the head portion 26 of the bolt 25 can be turned by a coin inserted in the straight groove so as to adjust the flat portion 27 from the first position to the second position. Then, the brake lever 20 can be pulled downwardly and the flat portion 27 extends through another second hole 24 so that the brake lever 20 is relocated. In this manner, the brake lever 20 may be moved and then retained in many increments as the skate brake 40 increasingly wears away.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

I claim:

1. A brake structure for an in-line roller-skate boot assembly comprising:

a sheathing attached to said boot assembly and defining therein a fish eye hole and a first hole;

a brake lever; means defining a plurality of second holes in said lever;

means defining a neck opening connecting each adjacent pair of said second holes, each said neck opening having a width less than the diameter of said second holes;

a link block pivotally attached to said brake lever and said boot assembly;

a skate brake fixedly attached to said link block; and a retaining bolt extending through said fish eye hole, one of said second holes and said first hole for connecting said sheathing and said brake lever together said retaining bolt having a stepped head and a flattened shank, extending therefrom, said flattened shank having a major width substantially equal to the diameter of each said second hole and a minor width less than said major width and substantially equal to the width of said neck opening, whereby said bolt is secured in a selective one of said second holes when said major width of said flattened shank thereof is transverse to said neck opening and said bolt can be moved from one said second hole to an adjacent said second hole through the connecting neck opening when said minor width of said flattened shank is transverse to said neck opening.

2. The brake structure for an in-line roller-skate boot assembly as claimed in claim 1, wherein said head portion of said bolt has a transverse groove defined therein.

\* \* \* \* \*